Feb. 14, 1967  E. A. RICHARDS  3,303,914
DOUBLE MODULATED TWIN ACTING HYDRAULIC CLUTCH
Filed Dec. 30, 1964  4 Sheets-Sheet 1

Inventor
Elmer A. Richards
By Joseph W. Malleck
Atty.

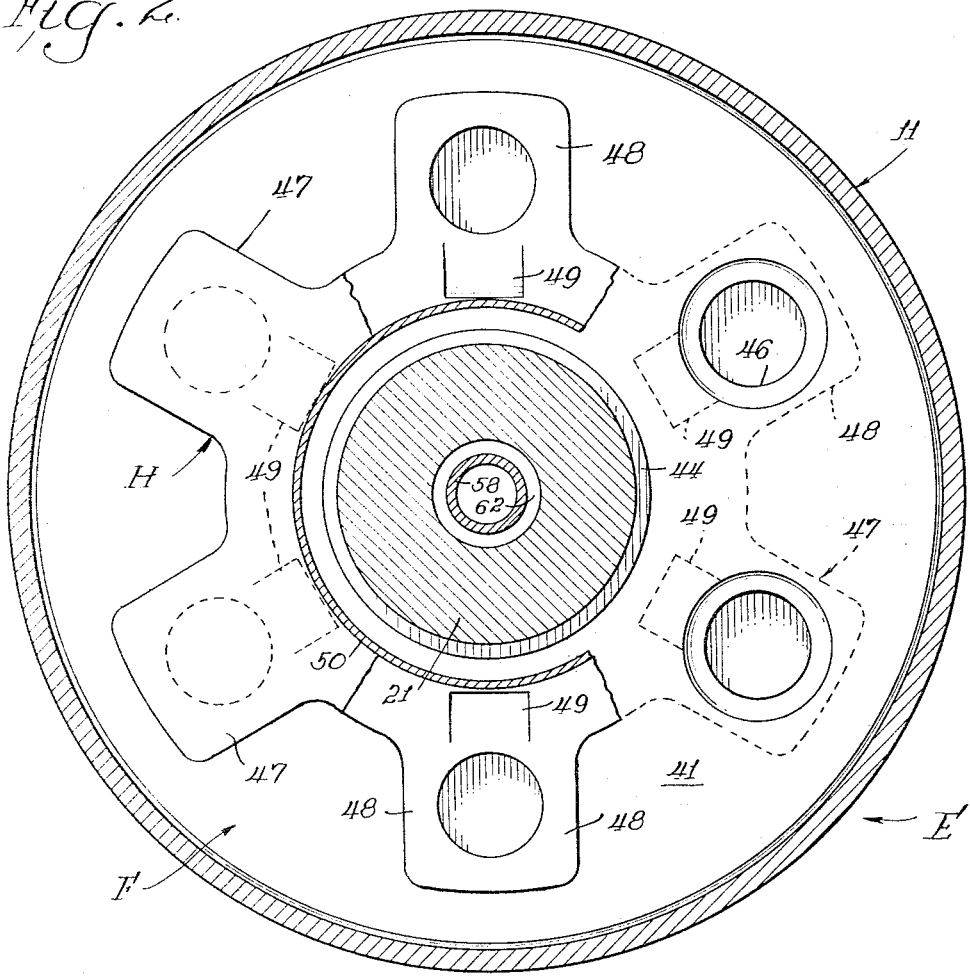

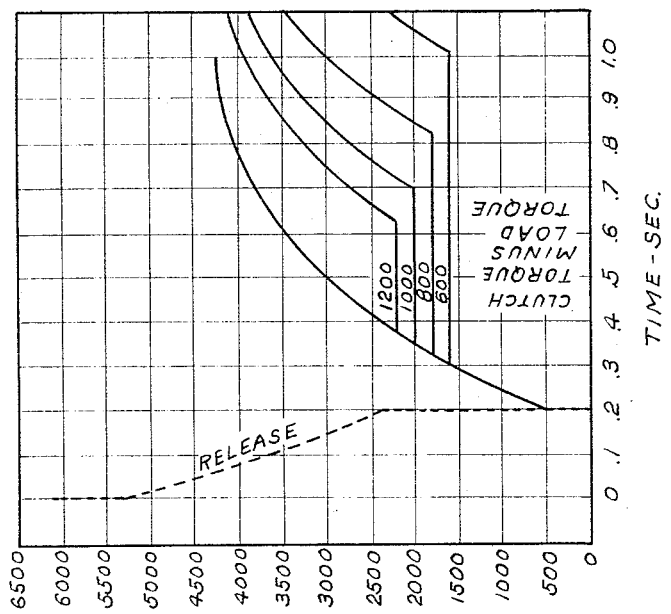
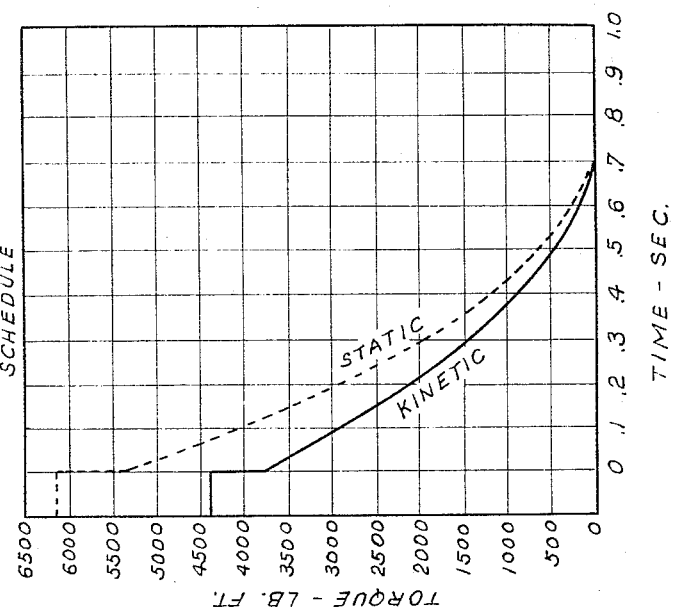

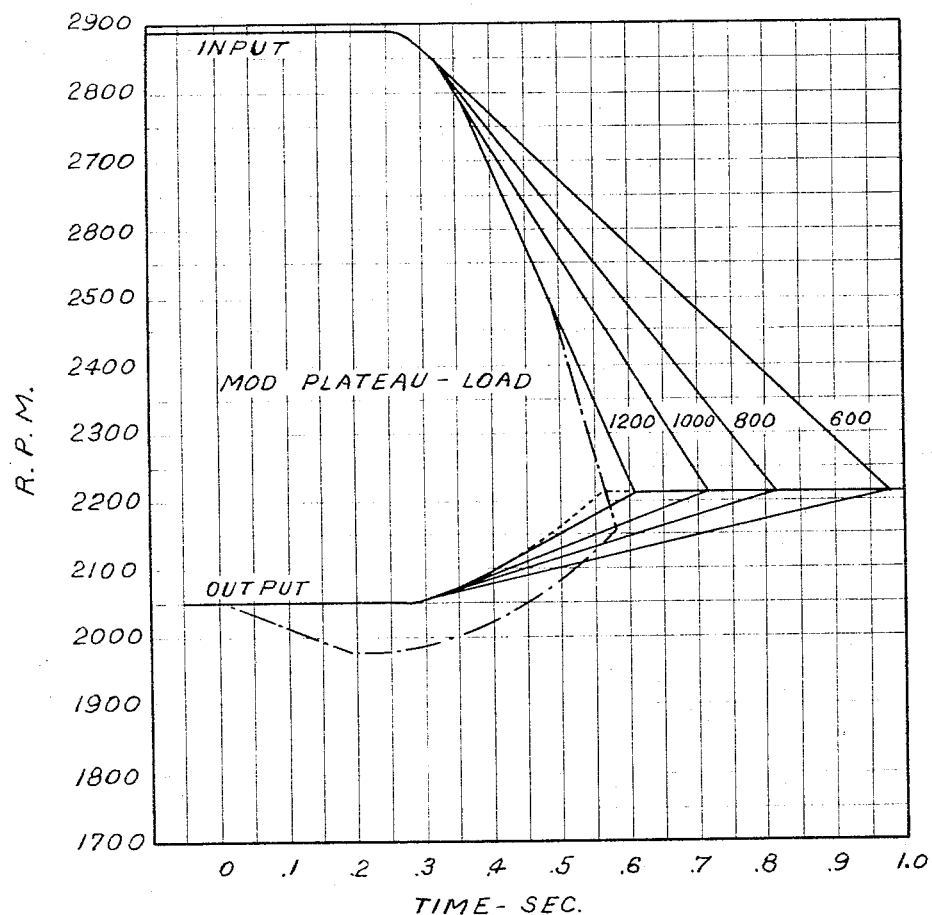

United States Patent Office 3,303,914
Patented Feb. 14, 1967

3,303,914
DOUBLE MODULATED TWIN ACTING
HYDRAULIC CLUTCH
Elmer A. Richards, Peoria, Ill., assignor to Borg-Warner
Corporation, Chicago, Ill., a corporation of Illinois
Filed Dec. 30, 1964, Ser. No. 422,369
2 Claims. (Cl. 192—87.17)

This invention relates to hydraulically operated clutch mechanisms and more particularly to mechanisms of the double-acting hydraulic type particularly characterized by enhanced modulated operation of either of a pair of opposed clutch packs.

This application is an improvement over U.S. Patent 3,032,157, assigned to the assignee of this invention.

A primary object of this invention is to provide a double-acting hydraulic clutch mechanism having modulating means for simultaneously regulating the shifting of torque transmitting capabilities from one clutch pack to the other with a greater degree of smoothness while maintained within controlled time limits.

The type of double-acting hydraulic clutch mechanism disclosed in previous U.S. Patents 2,920,732; 2,868,341 and 3,032,157 provided a contribution which enabled considerably more rapid shifting of heavy duty gear mechanisms while utilizing the reliability of hydraulic actuators. Such contributions comprise the use of a plurality of actuating chambers interposed between the double-acting clutch packs, certain opposed variable volume chambers affected more by centrifugal forces were devised to substantially maintain a given volume of pressurized fluid transferred therebetween; in order to stimulate such shifting of the confined volume of fluid in such chambers, smaller variable volume chambers less subject to centrifugal effects are uitlized to receive a pressurized signal from an exterior source, the latter being conventional in the previous art. The shift time of such a structure was reduced to the range of a fraction of a second where earlier hydraulic double-acting clutches required more time-consuming filling and exhausting operations of the opposed fluid chambers.

This invention is particularly composed with the employment of modulating features which, although prolonging the duration of shift time a fraction of a second more, do so only to the extent that is necessary to provide a much more smooth and controlled hydraulic shift.

Other objects and advantages of this invention will become apparent from the following detailed description taken in connection with the accompanying drawings, in which:

FIGURE 2 is a sectional view taken substantially along line 2—2 of FIGURE 1 and illustrating certain portions thereof broken away;

FIGURE 3 is a graphical illustration of time vs. torque of the releasing clutch pack;

FIGURE 4 is a composite graphical illustration of time vs. torque of the oncoming clutch pack and the releasing clutch pack; and FIGURE 5 is a composite graphical illustration of time vs. r.p.m. of the input and output shafts indicating how they are brought into conjoint rotation upon the engagement of one of the clutch packs.

Figure 1:
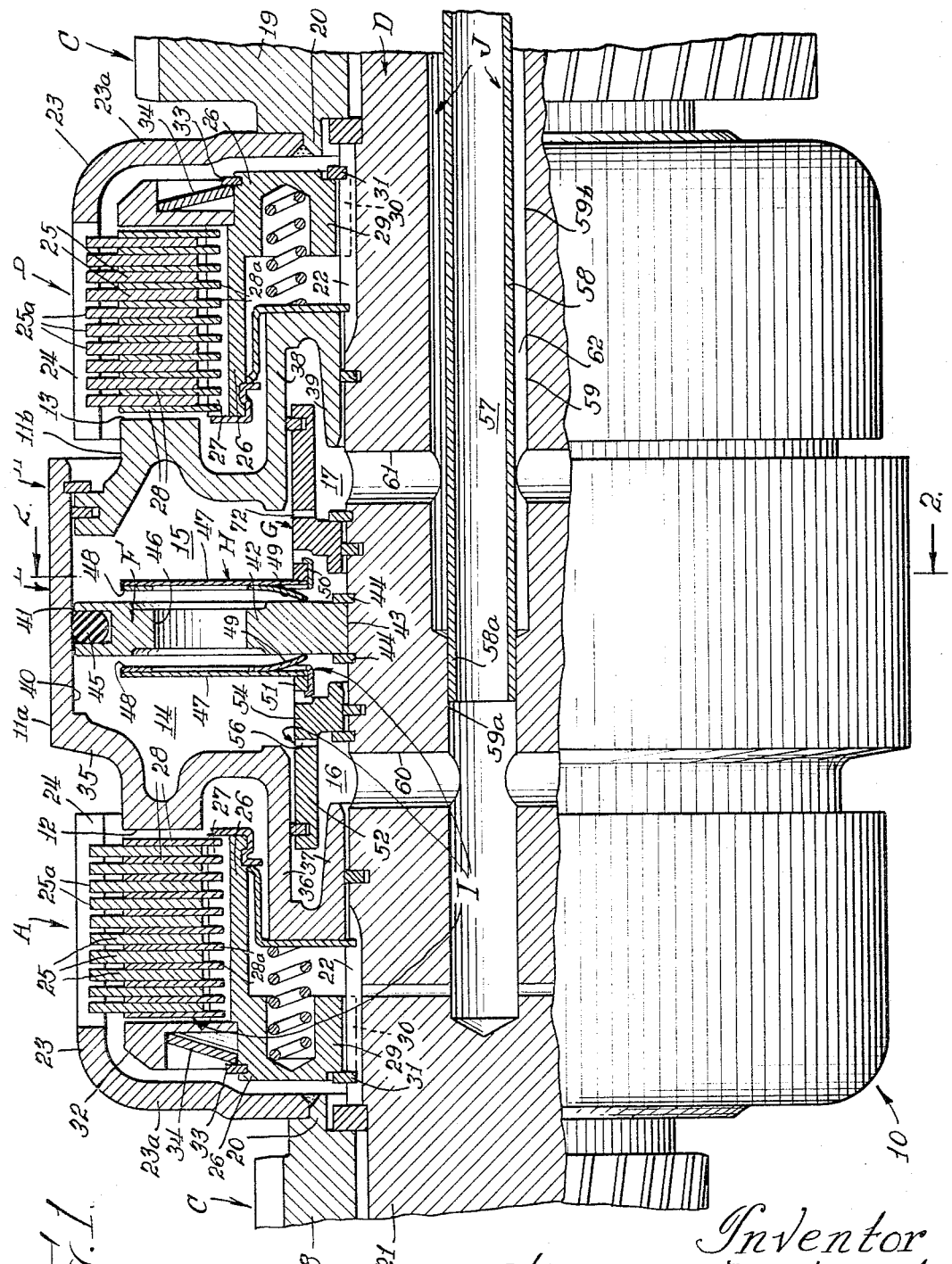
FIGURE 1 is an elevational view, partly shown in central section, of a double-acting clutch mechanism embodying the principles of this invention.

Referring now to the drawing and more particularly to FIGURE 1, the clutch of the present invention is indicated generally be reference numeral 10 and broadly comprises a pair of spaced clutch packs or means A and B, rotative input and output means C and D, a hydraulic actuating assembly E interposed between the clutch means and including a reciprocally movable element 11 provided with spaced pressure members 12 and 13 each for engaging one of said clutch means. The assembly comprises a plurality of fluid chambers 14, 15, 16 and 17 defined by a barrier means F separating the radially outermost chambers from each other as well as the radially innermost chambers from each other, said assembly having means G responsive to fluid in chambers 15 and 16 for moving an associated pressure member toward one of said clutch means and effective for controlling said one-way valve means H to normally permit fluid communication between the radially outermost chambers and also effective to prevent fluid flow therebetween in one direction upon the actuation of the fluid responsive means. The mechanism also comprises a fluid control means J for maintaining all of the chambers normally full of low pressure fluid and has means for selectively introducing high pressure fluid to either of said radially intermost chambers; and modulating means I for regulating the time/torque sequence of shifting between said clutch means.

In the preferred embodiment, the output means C comprises annular gears 18 and 19 each associated with one of the clutch packs A or B and each gear has annular lip 20 to which is attached a portion of the clutch means A or B respectively. The input means D comprises a shaft 21 having splines 22 formed thereon at spaced locations, each set of splines being provided for a driving connection with clutch means A or B.

Each of the clutch means A or B comprises a drum 23 having one end provided with flat annular portion 23a attached to one said gears 18 or 19 and overlapping said lip 20; the drum has internal splines 24 effective to drivingly carry a plurality of flat discs 25 having complementary splines 25a intermeshed with splines 24. A radially internal drum 26 is provided having exterior splines 27 effective to carry a plurality of flat friction discs 28 each having splines 28a intermeshed with the splines 27 of the drum; the drum also has a hub provided with internal splines 30 intermeshed with the splines 22 on the input shaft 21. Snap ring 31 provided in the exterior of shaft 21 is effective to limit outward movement of drum 26; and annular reaction ring 32 is disposed about the outer periphery of drum 26 and is stationed to one side of the interleaved clutch discs 28 and 25; and reaction ring is maintained against axially outward movement by a snap ring 33 provided in the outer periphery of the drum 26. An annular Belleville spring 34 is disposed between the reaction ring 32 and the clutch disc pack and forms a part of the modulating means I, as will be described.

The actuating assembly E comprises the reciprocally movable element 11 which is a composite of two nested members 11a and 11b; element 11 constitutes a reciprocal cylinder which is movable in response to internal fluid pressure in one or the other directions upon said input shaft 21. Member 11a has a cylindrical section with one end 35 closed and carries the annular element 12; said end closure is complete except for an opening to receive shaft 21. The annular pressure element 12 is arranged coaxially and aligned with the discs 25 and 28. Section 35 has a radially inner portion 36 provided with an axially extending sleeve having an inwardly turned lip 37 snugly fitting about the input shaft 21 and the element 11 is urged to neutral position by way of coil springs disposed on opposite sides thereof which react against the respective drums 26, as more particularly illustrated in U.S. Patent No. 3,032,157.

Member 11b is generally an end plate provided with the annular pressure element 13 and has at its radially inner periphery an axially extending sleeve 38 provided with an inwardly turned lip 39 snugly fitting about the input shaft 21.

The inner cylindrical surface 40 of member 11a is in sliding sealing engagement with the outer periphery 41 of the reaction means which substantially comprises a flat plate 42 having an inner periphery 43 drivingly associated with the outer periphery of the input shaft 21 to turn therewith; plate 42 is positioned thereon by snap rings 44. The outer periphery 41 has an O-ring 45 effective to provide said sealing relationship with the interior wall of member 11a. A plurality of openings 46 are defined in plate 42 communicating said outer chambers 14 and 15 when unblocked.

The actuating assembly further comprises the one-way fluid means H having a double-ply disc 47 disposed on each opposite side of said reaction plate 42; each disc 47 carry a plurality of tangs 48 effective to cover each of said plurality of openings when pressed against the side of said barrier plate 42. Said valve plates are normally maintained spaced from said barrier means by radially inwardly extending fingers 49 deformed from the plane of said disc effective to engage a side of said barrier plate and resiliently urge the disc to an axially spaced position; the inner periphery of each plate also has fingers 50 extending opposite to said spacing fingers 49, the former being effective to grip a flange 51 on accelerating piston 52 for movement therewith.

There are two accelerating or sliding minor pistons 52, forming part of said actuating assembly and each cooperate with said barrier plate 42 in defining said plurality of chambers 14–17; each of said sliding pistons 52 have a cylindrical portion carrying a radially inwardly extending annular lip 54 effective to engage the outer periphery of the shaft for sliding thereon. Each of said sliding pistons have a restrictive orifice 56 communicating the radially inner chamber 16 or 17 with one of the radially outer chambers 14 or 15; each orifice 56 is sized to provide a predetermined fluid flow therethrough and thereby functions as part of the modulating means I, as will be described.

An operative system within which said double-acting clutch mechanism may be employed is disclosed more fully in U.S. Patent 3,032,157 and which is incorporated herein by references. In such system a fluid control means J supplies fluid to each of said fluid chambers 14–17 first by introduction through a passage 57 defined by an imperforate tube 58 substantially spaced from the wall of a stepped bore 59 provided in the central portion of the input shaft 21; the end 58a of the imperforate tube communicates with the smaller reduced portion 59a of the bore which has a radially outwardly extending bore 60 communicating with the radially inner chamber 16. The space between the exterior of the tube 58 and the larger portion 59b of the stepped bore defines a passage 62 communicating by the way of a radially extending bore 61 with radially inward chamber 17. Each of the radially inner chambers 16 and 17 communicates with one of the radially outer chambers 14 or 15 through one of the restricted orifices 56 forming part of the modulating means as will be described.

To actuate one of the clutch packs A or B and provide for transmission of torque between the output means C and the input shaft 21, high pressure fluid is introduced into one of the passages 57 or 62 thereby pressurizing one of the minor chambers 16 or 17 and initiating movement of one of the sliding pistons 52 to overcome the spring fingers 49 of adjacent disc 47. Although the element 11 is subject to being moved by the introduction of high fluid pressure, the spring fingers 49 have the least resistance and are affected first. When a valve disc 47 is positioned by the influence of sliding piston 52, fluid no longer can flow freely through plate 42, high pressure fluid continues to exert force against the reciprocal element 11 both within one of the radially inner chambers and increasingly in the associated radially outer chamber as fed through a restricted orifice 56. The reciprocal element 11 undergoes a slack pick-up phase whereby the friction discs are brought into contact; a locking condition of the clutch is provided as high pressure fluid continues to increase in the radially outer chamber and seals tight the valve member against the barrier plate.

In the coordinated use of two opposed means provided in a single power shifting clutch mechanism, it is desirable to establish some degree of control over the release of torque by the retiring clutch and the build-up of torque by the oncoming clutch. The invention herein is directed toward (a) modulating the change in pressure of the chambers associated with the releasing clutch which directly affect the initial phase of pressure build-up by the oncoming clutch, (b) regulating or modulating the pressure conditions at which the fluid seal between the outer chambers is destroyed permitting fluid interchange, and (c) modulating the pressure variation within the chambers associated with the oncoming clutch.

First, modulation of the pressure variation of the chambers associated with the releasing clutch is achieved by providing the sole communication between a radially inner chamber 16 or 17 and a radialy outer chamber 14 or 15 through a restricted orifice 72 which, though permitting the pressure to bleed down from the radially outer chamber to the radially inner chamber, does so at a controlled rate which, for a brief period is virtually a hydraulic brake. As shown in FIGURE 3, an immediate reduction in torque by the releasing clutch is experienced due to the immediate drop in pressure of the radially inner chamber, the drop in torque further takes place along a gradual parabolic curve both for the static and the kinetic fluid contributions. It should be noted that this graphical illustration assumes that the seal between the radially outer chambers is maintained whereby the reduction in pressure of the radially outer chamber is provided solely by fluid leading through said restricted orifice 72. When the shift occurs, the pressure in the inner chamber 16 or 17 drops instantly to the level of lubrication pressure, resulting in an instant drop in torque capacity. The instant capacity drop is followed subsequently by a further capacity drop due to a gradual bleed flow from the outer to the inner chamber and also due to the relaxation of the ballooning effect on the metal parts constituting the defined chambers. Upon relief of the high pressure of the radially inner chamber, and to the degree that a pressure drop occurs through the restricted orifice, the period of capacity drop of the radially outer chamber will be modulated and prolonged. Thus the restricted orifice acts as a *momentary* hydraulic brake effective to the point that the fluid seal is maintained between the radially outer chambers. Heretofore, continuously operating hydraulic brakes have been employed, but not with the effect attempted here by a momentary hydraulic brake.

If a plurality of double-acting clutch mechanisms were employed in a transmission, release schedule of a releasing clutch one of the mechanisms would and does extend into the apply phase of the oncoming clutch of another of said mechanisms. The extent of overlap is dependent on the quickness of the operator of the hydraulic controls in shifting high pressure communication between one hydraulic passage and another. None-the-less, the variation in torque capacity of the releasing clutch has a very definite effect upon the combined input/output free rotating body until the torque capacity of the oncoming clutch overcomes the deteriorating capacity of the retiring clutch.

Control of the termination of the release phase of the retiring clutch is by deterioration of the fluid seal between the radially outer chambers. It is important to consider the forces acting upon the on-way fluid valves in order to appreciate the structural embodiment that is necessary to regulate the deterioration of the seal. The forces which tend to hold the applied minor piston against the barrier plate are:

$$F_c = A_{2-3}(P_2 - P_3)$$

$A_{2-3}$ = area of the accelerator piston exposed to the pressure within one chamber 14 or 15.

| Configuration | Max. Dec., r.p.m./sec. | Max. Acc., r.p.m./sec. | Acc., r.p.m./sec. | Roughness Ratio |
|---|---|---|---|---|
| Unmodulated Clutch | 234 | 1,150 | 1,384 | 1.0 |
| Single Modulation Instant Release | 234 | 550 | 784 | .566 |
| Single Modulation Controlled Release | 37 | 540 | 577 | .412 |
| Double Modulation Controlled Release | 37 | 170 | 207 | .150 |

The forces tending to move the accelerator piston away from the barrier plate are:

$$F_0 = A_{2-1} \times (P_2 - P_1) + F_s \text{ (spring force)}$$

$A_{2-1}$ = area of accelerator piston exposed to the pressure within one chamber 16 or 17.

When these two forces are equal, the fluid seal between the chambers breaks and their pressure difference becomes zero which terminates the release phase. By selecting the areas of the openings through the barrier plate to be larger than the area of the accelerator pistons which affect the above force equations, in conjunction with the selection of appropriate spring forces which provide a normal bias to the valve members, the retiring clutch may be made to release at a pre-selected chamber 14 or 15 pressure. Experience and testing have shown that sufficiently consistent and reliable time intervals can be coordinated with the travel time to be experienced by the oncoming clutch. A novel method for providing a spring bias for the valve members is shown in FIGURE 1 wherein the double-ply valve plates have radially inwardly extending fingers 73 normally bent toward the barrier means and which tend to urge the valve plates away a specific distance.

Modulation and regulation of the oncoming phase of the time vs. torque relationship of the oncoming clutch can be obtained by pre-loading the clutch backing plate with a Belleville type annular spring 32. Spring 32 leaves the capacity schedule unchanged up to the point which the reciprocal member begins to engage the clutch pack and initiates a pre-loading effect upon the Belleville spring. At this point, fluid displacement into the radially outer chamber must be provided by fluid bleed through the restricted orifice from the high pressure condition existing in the radially inner chamber. The volume relationship to the flow rate through the restricted bleed orifice 72 is such that a displacement "D" of approximately .03" will cause a torque plateau to exist for 5 seconds at 50% capacity (see FIGURE 4). The magnitude of the torque of the plateau and its duration can be established by proper selection of the Belleville springs. In order to analyze the desirability of a specific spring 32, a graphical illustration relating the maximum load can be prepared as shown in FIGURE 4 as a combined schedule of the oncoming and retiring clutches. Their effect upon the activity of the clutching members can be graphically illustrated as in FIGURE 5 where the input and output members are brought into conjoint rotation with relationship to time.

It can be seen that the combination of the above structural features of modulation make it possible to control both the magnitude of the angular acceleration and its rate of change on the output shaft.

A summary of the comparative roughness of the various prior art configuration as compared with the structural combination of this invention, is expressed in the following chart of accelerations and decelerations:

The values of this chart are of output shaft conditions. The above chart indicates that the modulation features are desirable because they are additive. The reduction acceleration is associated with the reduction in energy in such a manner that the smoothness results in increased durability of the clutch mechanism.

While I have described my invention in connection with one specific embodiment, it is to be understood that this is by way of illustration and not by way of limitation and the scope of my invention is defined solely by the appended claims which should be constructed as broadly as the prior art will permit.

I claim:

1. A double-acting hydraulic clutch, comprising: a pair of spaced clutch means having rotative input and output means; a hydraulic actuating assembly interposed between said clutch means and having a reciprocally moveable element provided with spaced pressure members each for engaging one of said clutch means, said assembly further having means defining a plurality of annular fluid chambers with two radially innermost chambers and two radially outermost chambers, barrier means including reaction means separating said radially outermost chambers from each other and the radially innermost chambers from each other, said assembly having means responsive to fluid in chambers disposed to one side of said reaction means for moving an associated pressure member toward one of said clutch means, one-way valve means effective to normally permit fluid communication between said radially outermost chambers and to prevent fluid flow in one direction upon the actuation of said fluid responsive means, fluid control means for maintaining all of said chambers normally full of low pressure fluid and having means for selectively introducing high pressure fluid to either of said radially innermost chambers, modulating means comprising at least one restricted orifice communicating each of said radially innermost chambers with one of said radially outermost chambers to delay release of either clutch means, and resilient means interposed in said clutch means effective to be energized to delay complete clutch engagement of either clutch means, said barrier means has one or more transfer openings communicating opposite radially outermost chambers, and said one-way valve means comprising a pair of annular discs operably mounted upon opposite sides of said barrier means, each disc carrying at least one tang effective to close off said transfer opening when pressed against a side of said barrier means while permitting fluid flow in only one direction, said discs each carrying a plurality of radially inwardly extending fingers offset from the plane of said discs and effective to normally encourage said discs to a spaced position from the barrier means for providing a positive release of the fluid seal between the tang and barrier means.

2. A double acting hydraulic clutch as in claim 1, in which the throat area of said transfer opening is sized with respect to the restricted opening communicating said radially inner and outer chambers, said transfer opening also being sized with respect to the force with which said resilient fingers urge each disc to release the associated tang from a fluid seal with the barrier means whereby a predetermined differential pressure at which the seal deteriorates can be insured.

References Cited by the Examiner

UNITED STATES PATENTS

| | | | |
|---|---|---|---|
| 2,868,341 | 1/1959 | Snoy | 192—109 X |
| 2,920,732 | 1/1960 | Richards et al. | 192—109 X |
| 3,032,157 | 5/1962 | Richards | 192—87 |
| 3,054,491 | 9/1962 | Bloch et al. | 192—109 X |
| 3,098,550 | 7/1963 | Schwab | 192—87 |
| 3,106,999 | 10/1963 | Snoy | 192—87 |

DAVID J. WILLIAMOWSKY, *Primary Examiner.*

BENJAMIN W. WYCHE, *Examiner.*